Dec. 13, 1949  S. SAMETH  2,491,137
EYE PROTECTOR
Filed Feb. 10, 1947  2 Sheets-Sheet 1
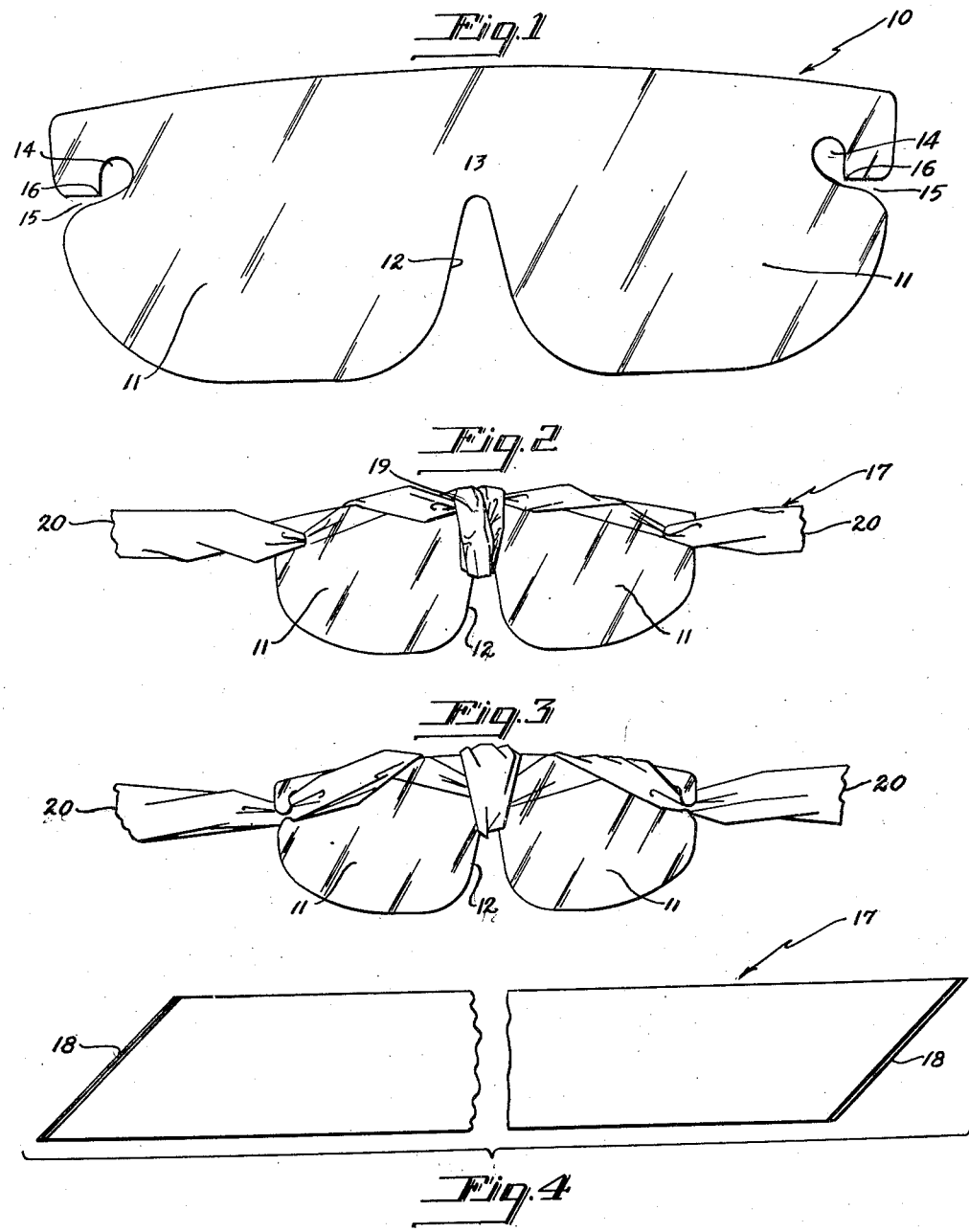
INVENTOR.
Sigmund Sameth
BY
ATTORNEY Dec. 13, 1949     S. SAMETH     2,491,137
EYE PROTECTOR
Filed Feb. 10, 1947     2 Sheets-Sheet 2
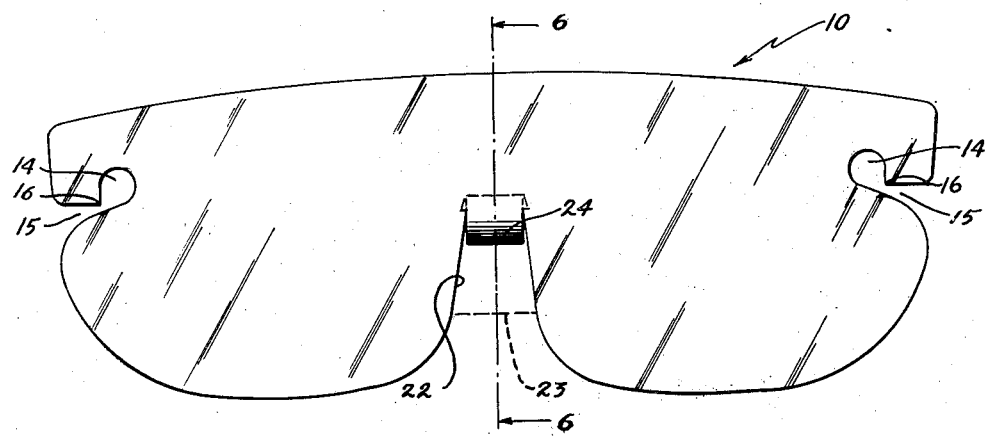
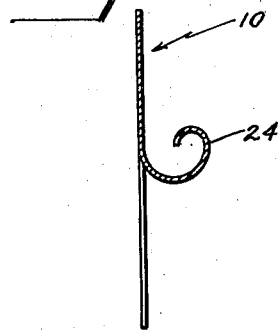
INVENTOR.
Sigmund Sameth
BY
ATTORNEY

Patented Dec. 13, 1949

2,491,137

UNITED STATES PATENT OFFICE 2,491,137

EYE PROTECTOR

Sigmund Sameth, New York, N. Y.

Application February 10, 1947, Serial No. 727,528

5 Claims. (Cl. 2—14)

The present invention relates to an eye protector, more particularly, to eye glasses or goggles used to protect the eyes against the glare of the sun or the like.

Eye protectors of the character described generally comprise a pair of lenses made of a transparent material, such as glass or synthetic plastic, colored to screen out the direct and reflected eye-straining rays of the sun, yet permitting otherwise clear vision. In the more common and cheaper forms of goggles, the lenses are not polished or ground for vision correction, but are in the form of ordinary flat planes. These lenses are mounted in frames having hinged ear pieces. In the more common forms, these frames and ear pieces are roughly made of synthetic plastic materials and the hinges are, generally of inferior construction. As a result, such goggles as are at present obtainable are, generally, of rough finish and unattractive appearance and their frames, hinges and ear pieces break easily, at relatively slight strains.

It is the general object of the present invention, therefore, to provide goggles of the character described in which all of the foregoing disadvantages are eliminated and which have, in addition, many other improved and desirable characteristics.

It is the object of the present invention to provide goggles of the character described which are of pleasing and attractive appearance, regardless of quality or cost.

It is also an object of the present invention to provide goggles of the character described which are not only pleasing and attractive in appearance, but which are highly individualized, each being capable of decorative variation to match the taste or costume of the wearer.

It is another object of the present invention to provide goggles of the charcater described in which the conventional, rigid frame and ear pieces for support'ng the device on the face are eliminated, thereby eliminating their breakable portions and rendering them more durable.

It is still another object of the present invention to provide goggles of the character described having unitary, non-rigid means for engaging the lenses and for supporting them on the face.

It is a further object of the present invention to provide goggles of the character described having such unitary, non-rigid supporting means which are easily interchangeable at will.

It is a further object of the present invention to provide goggles of the character described which are comfortable to wear and which afford improved protection for the eyes against wind and dust.

It is a still further object of the present invention to provide goggles of the character described which are compact and convenient to carry; which are economical to produce; and which are simple and convenient to use.

The foregoing and other advantages and superiorities of the eye protectors of the present invention will become more readily apparent from the several embodiments thereof shown in the accompanying drawing and from the description following. It is to be understood, however, that such embodiments are shown by way of illustration only, to make the principles and practice of the invention more readily comprehensible to those skilled in the art, and without any intent of limiting the invention to the specific details therein shown.

In the drawings:

Fig. 1 is a plan view of a goggle blank or shield of the present invention;

Fig. 2 is a plan view, on a reduced scale, of the inner face of the eye shield, shown with an attaching band in place thereon;

Fig. 3 is a view similar to that of Fig. 2, showing the reverse side of the eye shield;

Fig. 4 is a broken plan view of one embodiment of an attaching band for the eye shield;

Fig. 5 is a plan view of another embodiment of an eye shield of the present invention, shown from the inner face thereof; and Fig. 6 is a section taken on line 6—6 of Fig. 5.

Referring more specifically to the accompanying drawings, the eye protector of the present invention comprises a transparent blank or shield 10, which may be made of glass or, preferably, of any suitable type of synthetic plastic material, such as one of the acrylic or vinylic plastics, which are resilient to a degree. The shield 10 may be colored to absorb the undesirable direct or reflected rays of the sun, yet permitting clear vision.

The shade 10 may be a unit, molded or stamped out, as desired, and may comprise a pair of lens portions 11, which may or may not be polished or ground for vision correction, and they may be spaced from one another along the lower portion of the shade 10 by the nose admitting notch 12, and connected along the upper portion thereof by the bridge portion 13.

The shade 10 is provided, on each side, adjacent its upper corner, with an aperture 14, which is connected with the exterior by means of a passageway 15, which is restricted at its point of connection with the aperture 14 at its bottom, and widens outwardly, terminating in a side edge of the shield 10. The aperture 14 may be formed with a sharp corner 16 to hinder the withdrawal, through the passageway, of any object inserted into the aperture 14.

Interchangeable, flexible, unitary means may be provided for mounting and securing the shield 10 on the face. Such means may comprise a flexible band 17, preferably a fabric band, as of cotton, silk or nylon, or similar, suitable, textile fabric. The band 17 may be of a width permitting its being folded over longitudinally, to provide sufficient bulk. It may, preferably, be cut transversely from a fabric bolt, so that its end edges 18 may have the natural selvage of the fabric, so as not to unravel, eliminating the need for any seams at the ends. When the fabric from which the band 17 is to be cut is of insufficient width to provide the required band length, the bands 17 may be cut on a bias, as illustrated, thus obtaining the proper band length.

The band 17 may preferably be of an ornamental or decorative pattern and, after it is folded longitudinally, it may be folded, at approximately its center, around the bridge 13 of the shield 10 and tied about it with a simple or primary knot 19, which is arranged against a flat side of the bridge, to act as a cushion and spacing means. The ends 20 of the knot are then each bent or thrown over the top edge of the shield 10, and bent sideways over the outer face of the shield, and inserted through the respective passageway 15 into the corresponding aperture 14, so that the free ends 20 project from the inner face of the shield 10.

Thus, assembled, the shield 10 is then mounted over the face, the knot 19 serving as a cushion for the nose as means for spacing the shield 10 from the face, so as not to interfere with the eyelashes, and the ends of the band are then tied at the rear of the head in a manner which will be readily understood.

In the embodiment of Figs. 5 and 6, a portion of the material between the lenses 12 is cut away from the lenses at the sides, as at 22, and is allowed to remain connected to the bridge 13, forming a tongue 23. The tongue 23, particularly when the shield 10 is made of plastic, may be readily softened by heat and rolled up to form a bead 24 on the inner face of the shield 10 to serve as means for spacing the shield from the face. The embodiment of Figs. 5 and 6 may, otherwise, be assembled with a band 17, in the same manner as the embodiment of Figs. 1–3, as described above.

This completes the description of the eye shield and band assembly forming the eye protectors of the present invention. It will be readily apparent that the shield portion of the assembly may be easily and readily formed to have a graceful and decorative outline. It will also be apparent that the attaching band is likewise simple and economical to produce and may, if desired, be of any desired decorative effect. It will also be apparent that the shield and band may be easily and readily assembled and that together they will make a highly pleasing, decorative, individualized and attractive eye protecting device and dress accessory which it is easy and simple to put on, comfortable to wear and just as easy and simple to remove.

It may here be stated that the device of the present invention, when made of a plastic material, which is resilient, forms, by reason of the band supporting means, improved eye protecting means against wind and dust, as the shield portion tends to conform to the curvature of the face, when worn, to reduce the space between it and the face at the sides.

The resiliency of the material will also tend to act as a spring, to keep the goggles tightly in place at all times and with uniform, comfortable pressure on the face, in accordance with individual preference.

It may here also be stated that the band, besides acting to retain the shield in place, may also have the additional, highly useful and desirable functions of serving as a sweat absorbing band and to keep the hair in place.

As, obviously, many variations and modifications may be made in the eye protectors of the present invention, in accordance with the principles thereof above set forth, without the use of any inventive ingenuity, I desire to be protected for any and all such variations and modifications that may be made within the spirit of this invention and the scope of the claims hereto appended.

What I claim is:

1. An eye protector of the character described, comprising, in combination, a unitary, transparent shield having two spaced lens portions connected at their upper edges by a bridge portion, said shield having an opening formed therein adjacent each upper corner thereof, each of said openings connected with a side edge of the shield, and a supporting member comprising an elongated fabric band tied at about its center about the said bridge portion with the knot arranged along a flat face thereof, each of the ends of the said band being folded over the top edge of the shield to the other face thereof and inserted through one of said openings to project to the side of the knot.

2. An eye protector of the character described, comprising, in combination, a unitary, colored transparent shield member having two spaced lens portions connected at their upper edges by a bridge portion, said shield having an opening formed therein adjacent each upper corner thereof, each of said openings connected with a side edge of the shield, and a supporting member comprising an elongated, folded fabric band tied at approximately its center about the said bridge with the knot arranged along a flat face thereof, each of the ends of the band being folded over the top edge of the shield to the other face thereof and inserted through one of said openings to project to the side of the knot.

3. An eye protector of the character described, comprising, in combination, a unitary, colored, transparent, resilient shield member having two spaced lens portions connected along their upper edges by a bridge portion, said shield portion having an opening formed therein adjacent each upper corner thereof, each of said openings connected by a constricted passageway to a side edge of the shield, and a supporting member comprising a folded, elongated fabric band tied at approximately its center about the said bridge portion with the knot arranged along a flat face thereof, each of the ends of said band being folded over the top edge of the shield to the other face thereof and inserted through one of said openings to project to the side of the knot.

4. An eye protector of the character described, comprising, in combination, a unitary, transparent, resilient shield having two lens portions connected along their tops by a bridge portion, said bridge portion having a spacing bead formed on its lower edge, said shield having an opening formed therein adjacent each upper corner thereof and inwardly tapering slots formed therein connecting each of said openings with a side edge of said shield wherethrough a band may be inserted into the said openings, and a supporting band comprising an elongated fabric band folded and tied about the said bridge portion of the shield, the knot arranged on the bead side of the said bridge and its ends folded over the top edge of the shield and extended sideways and inserted into the said openings to project therefrom on the side of the knot.

5. An eye protector of the character described, comprising in combination, a unitary, transparent, resilient shield having two lens portions connected along their tops by a bridge portion, said shield having an opening formed therein adjacent each upper corner thereof and slots connecting each of the said openings to an edge of the said shield wherethrough a band may be inserted into the said openings, and a supporting band comprising an elongated fabric band folded and tied about the said bridge with the knot formed along a face of the said bridge and the ends of the said band folded over the top edge of the shield and extended sideways and inserted through said slots into the said openings to project therefrom on the side of the knot.

SIGMUND SAMETH.

REFERENCES CITED

The following references are of record in the file of this patent:

UNITED STATES PATENTS

| Number | Name | Date |
| --- | --- | --- |
| 399,892 | Harrison | Mar. 19, 1889 |
| 1,310,077 | Heaford | July 15, 1919 |
| 1,345,782 | Keller | July 6, 1920 |
| 1,382,693 | Tileston | June 28, 1921 |
| 2,092,805 | Jones | Sept. 14, 1937 |